United States Patent [19]
Koshaev

[11] 3,812,762
[45] May 28, 1974

[54] GEAR-CUTTING MACHINE

[76] Inventor: Alexei Petrovich Koshaev, ulitsa Ogorodnaya 170/I kv. 29, Saratov, U.S.S.R.

[22] Filed: Feb. 28, 1972

[21] Appl. No.: 230,105

Related U.S. Application Data

[63] Continuation of Ser. No. 850,040, Aug. 14, 1969.

[52] U.S. Cl. .................................. 90/10
[51] Int. Cl. ............................... B23f 1/04
[58] Field of Search ............... 90/6, 8, 10, 3, 9, 1

[56] References Cited
UNITED STATES PATENTS
2,895,384   7/1959   Baxter, Jr. et al. ............... 90/6
2,953,068   9/1960   Carlsen ............................ 90/6

*Primary Examiner*—Gil Weidenfeld
*Attorney, Agent, or Firm*—Waters, Roditi & Schwartz

[57] ABSTRACT

A support for a machine for cutting straight toothed bevel gears comprises a tool holder supported from first and second adjusting assemblies, the tool holder undergoing rotational movement about one assembly by means of a drive connection therefrom while undergoing oscillating movement about the second assembly so as to perform an oscillatory movement in which the tip of a tool carried by the holder moves along a closed curve of wedge-like form.

3 Claims, 7 Drawing Figures

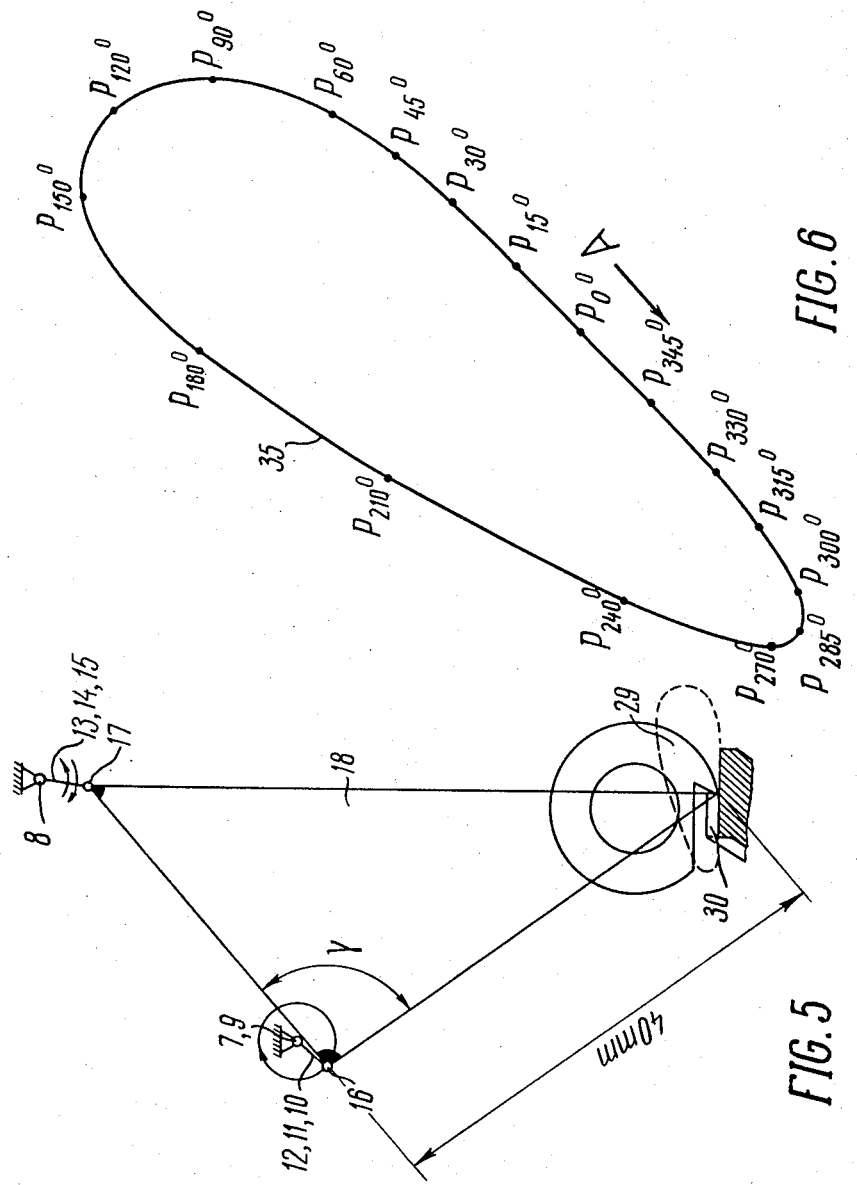

GEAR-CUTTING MACHINE

This is a continuation of application Ser. No. 850,040 filed Aug. 14, 1973, now abandoned.

The present invetion relates to improvements in gear-cutting machine tools, such machines being applicable for cutting straight bevel gears and like members, such as tooth face couplings members and gear segments.

Known in the art is a gear-cutting machine for cutting straight bevel gears and tooth face coupling members which is employed to cut the teeth of a gear member by the generating method or simply by infeeding the tool depthwise into the work, employing intermittent indexing motion and a pair of stroking tools operating in the same tooth slot.

In this known machine there are two supports which actuate the tools via a system of levers connected to one another and to the supports by pivotal connections.

One of the tool driving elements constitutes an adjusting assembly and is made as a shaft with an eccentric portion serving as a crank pin engaging in a radially offset hole provided in a sleeve, pivotally arranged within the tool support. A change of the angular position of the shaft, relative to the sleeve results in a change in eccentricity of the eccentric portion and sleeve so as to control the extent of tool displacement. Another tool driving and carrying element which at the same time incorporates tool holding means is connected to the lever system by the aid of said shaft and sleeve, which constitute an adjusting element, and another pivotal connection. In operation both pivotal connections are subjected to motion relative to the stationary tool support.

The tip of the tool lies on a straight line extending in a direction that passes through the axes of both displaceable pivotal connections or in the vicinity thereof.

The entire lever system is of such an arrangement that it is able to provide motion for the tool practically, along an elliptical orbit, the major axis of which extends substantially parallel to the flank of a tooth that is cut, (a method of cutting without any generating roll). However, when cutting by a method of generation, this axis extends substantially parallel to the tooth flank of the imaginary generating gear.

Because the tool driving and carrying element which incorporates the tool holding means is pivotally connected with the lever system, a disadvantage is obtained that the whole system becomes insufficiently rigid because of the effect of alternating lateral loads applied thereto, while cutting, and a relatively long arm is obtained between the tool tip and the pivot axis, while also too short a distance is provided between said axis and a second pivotal connection disposed on this lever.

The lever system is capable of providing tool motion only along an elliptical path, and by changing the size of an adjustment assembly it is possible to obtain a series of elliptical paths of the movement of the tool which differ only in size. The elliptical path of movement of the tool in cutting provides substantially an indentical tooth shape, from end to end, and the shape of the tooth bottom, which, upon changing the size of the adjusting element practically does not alter their specific properties and geometrical proportions.

Moreover, the lack of rigidity of the tool driving and carrying system results in low accuracy in cutting a gear and decreases the machine efficiency.

An object of this invention is to overcome the disadvantages of the known construction.

The principal object of this invention is to provide a gear-cutting machine for cutting straight bevel gears and similar members in which it becomes possible to control the path of tool movement and, particularly, to provide such a cutting movement of the cutting edge of a tool which is substantially rectilinear.

This is necessary for producing bevel gears of various tooth shape and root surfaces, for example, for machining a gear which is to mate with a gear cut by a machine employing disk milling cutters.

This object is solved by the provision of support of a gearcutting machine for bevel gears and similar members, a tool support with two adjusting assemblies each being constructed in the form of a crank mechanism with adjustable eccentricity. The tool holder with a tool on it is mounted on the tool support by means of these assemblies whice serve as a tool drive means. The first adjusting assembly is made in a form of a sleeve mounted on the tool support and having a bore eccentric to its axis. This bore houses the shaft of the crank mechanism while the crank pin of this mechanism carries the tool holder, so that at the time of operation only the first adjusting assembly receives rotational motion from a drive transmission. The second adjusting assembly is made in a form of a sleeve having a bore eccentric to its axis and mounted on the tool holder, this bore housing the crank pin of another crank mechanism while the shaft of this mechanism is mounted on the tool support. In operation, the tool holder generates oscillatory motion of the second adjusting assembly. Hence, the sum of the rotational motion of the first adjusting assembly and oscillatory motion of the second adjusting assembly will give a complex motion of the tool tip in a form of a closed wedge-type curve. In accordance with the invention, the drive means for the tool is characterized in that intersection points of the geometrical axis of the crank pin of the first assembly and the sleeve of the second assembly and the tip of the tool in the plane of the tool holder, represent vertices of an imaginary triangle.

It is preferred to dispose the tool tip no less than 40 mm from an imaginary line segment connecting the geometrical axes of the crank pin of the first assembly and the sleeve of the second assembly. It is also preferred to locate the tip of the tool on an imaginary straight line which intersects the geometrical axis of the crank pin of the first assembly such that the line is inclined with respect to the imaginary line segment connecting the axis of the crank pin of the first adjusting assembly and that the axis of the sleeve of the second adjusting assembly.

For controlling the trajectory of the tool movement across the working zone and for attaining a substantially straight or a curvilinear movement thereof with a predetermined radius, it is possible to adjust the adjusting assemblies, i.e., the degree of eccentricity thereof.

In the following part of the description the preferred embodiment of the invention will be given with references to the accompanying drawings, wherein:

FIG. 5 is a diagrammatical representation of the geometry of movement of the tool support members;

FIG. 6 is an illustration of the trajectory of the tool movement; and

Figure 1:
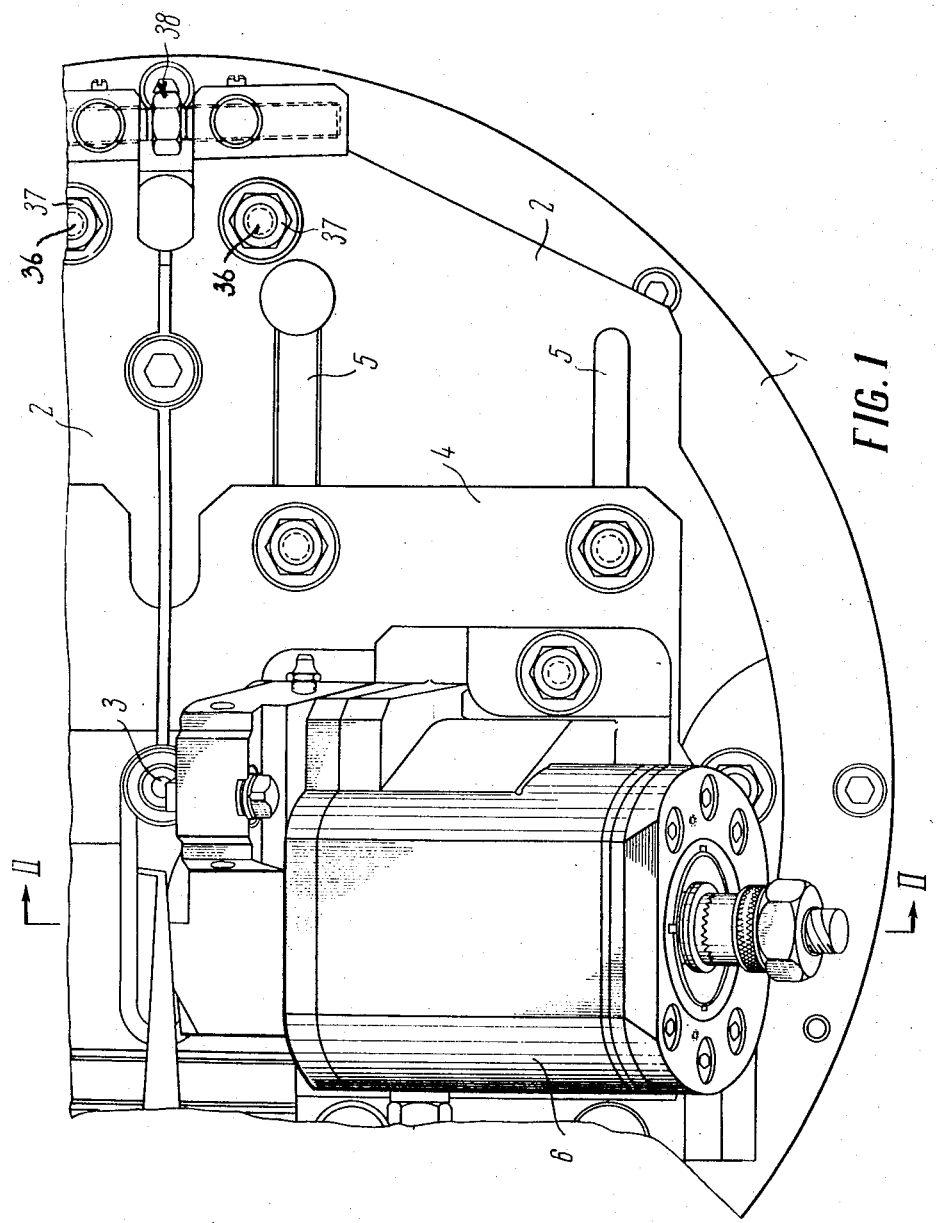
FIG. 1 is a fragmentary view of the cradle of the machine, showing the tool support.

The machine of the invention includes a cradle which comprises a generating roll drum 1 (FIG. 1) to the face of which plates 2 are secured by means of nuts 37 threaded on clamp bolts 36 to provide settings of a tool 29 in agreement with a given root angle of work. The settings may be effected by a turnbuckle 38 after first loosening nuts 37 on the clamp bolts whose heads are retained in arcuate T-slots (not shown) in the generating roll drum 1. The plates 2 thus may be adjustably fixed about a cradle axis 3.

The plate 2 has movably secured thereto a support 4, which may be adjustably moved along slots 5 arranged in the plate 2 to adjust the position of the tool tip with respect to the machine center.

The support 4 carries a tool support 6 (FIGS. 2 and 3) provided with a cylindrical portion which extends through holes made in the plate 2 and support 4 and a hole made in the generating roll drum 1.

Figure 2:
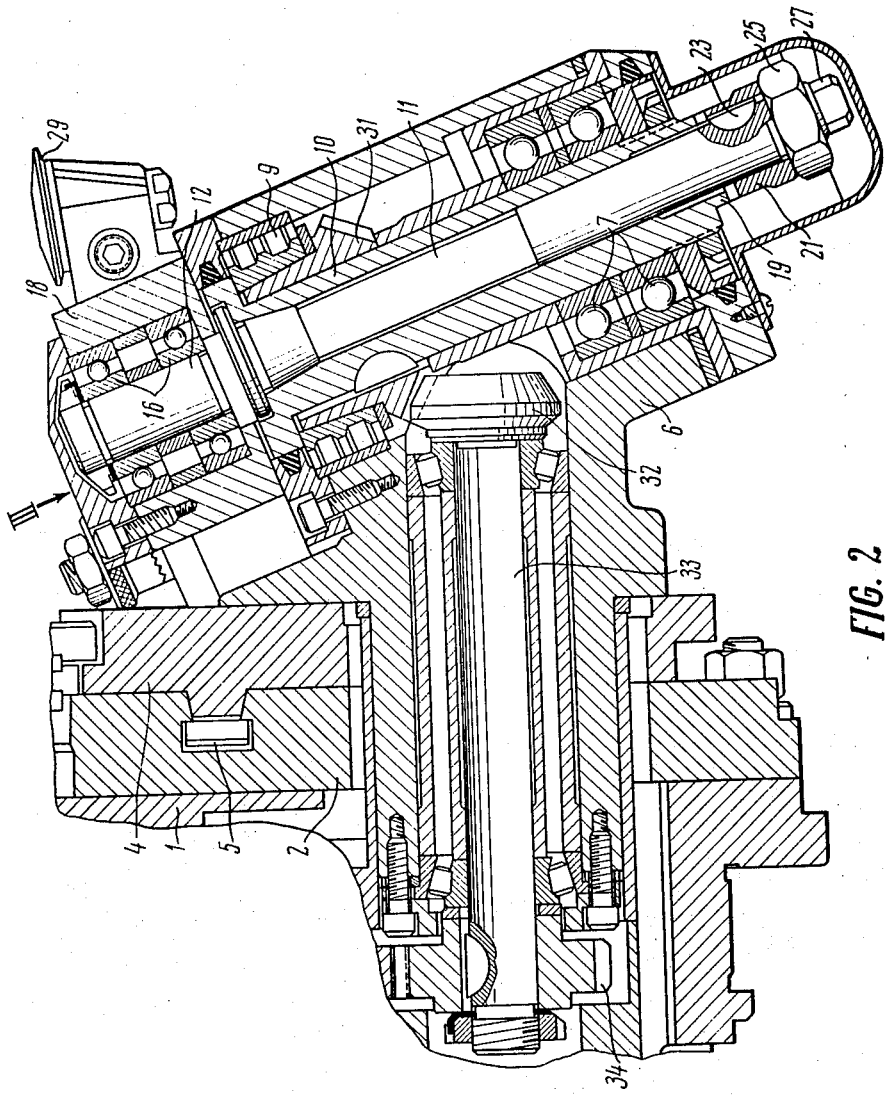
FIG. 2 is a sectional view taken along line II—II in FIG. 1.
Figure 4:
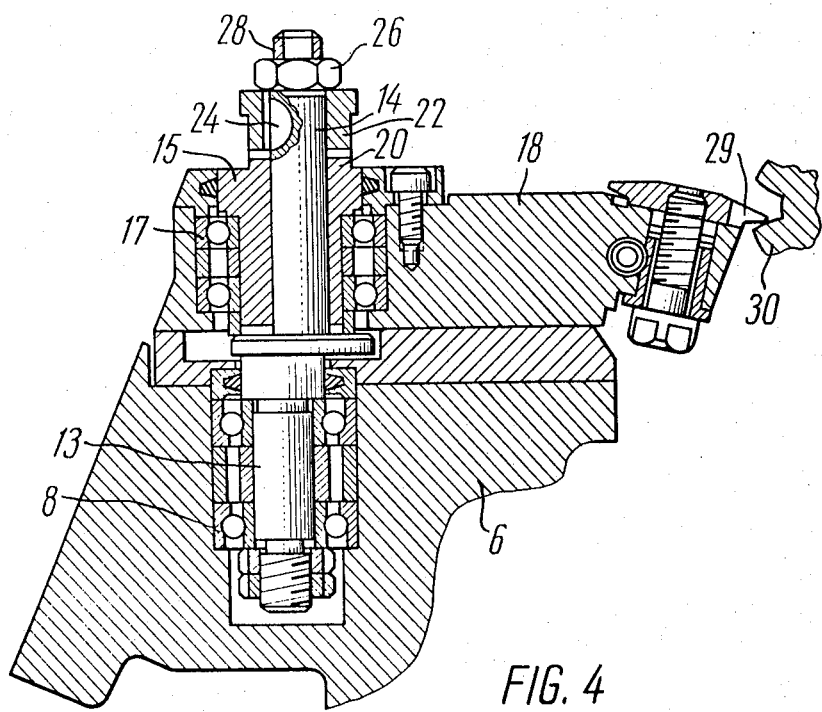
FIG. 4 is a sectional view taken along the line IV—IV in FIG. 3.
Figure 7:
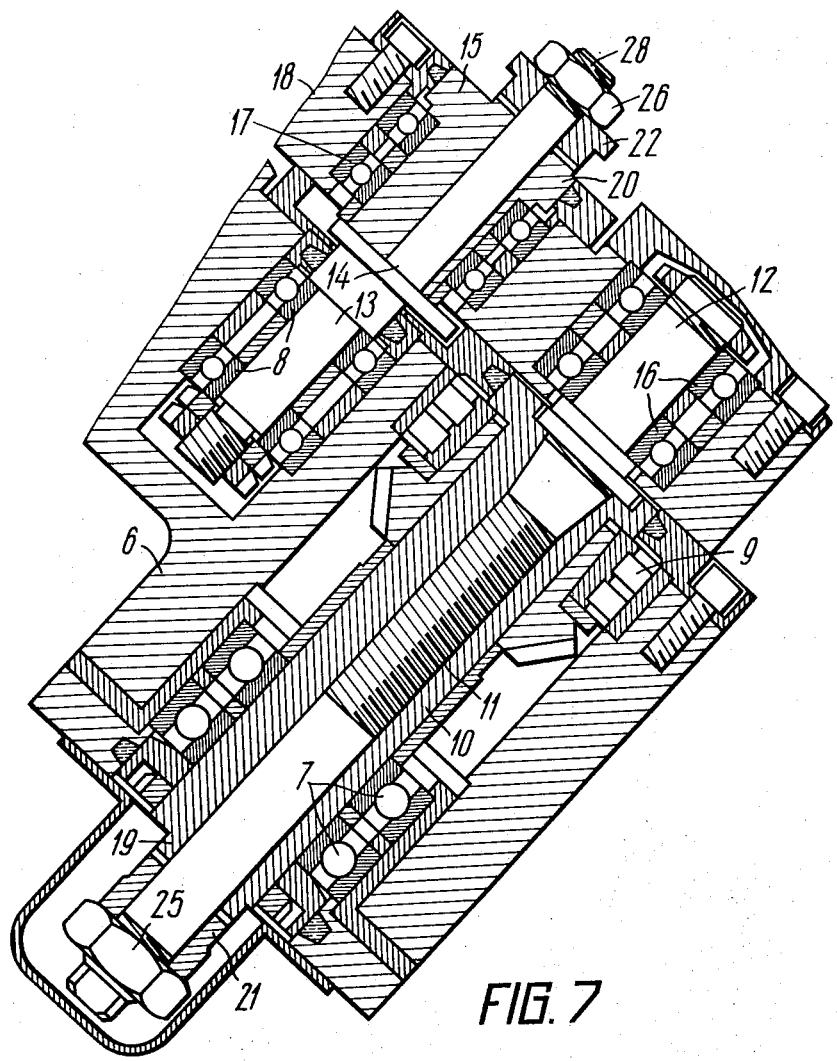
FIG. 7 is a sectional view taken on line VII—VII in FIG. 3.

Within the tool support 6 are mounted two pivotal assemblies, one of which is associated with the drive transmission and has radial thrust bearings 7 and 9 therein, the other assembly having radial thrust bearings 8 therein (FIGS. 2, 4 and 7).

The axes of said bearings are inclined with respect to the face of the drum 1 at an angle equal to the generating pressure angle of the work gear tooth.

Figure 3:
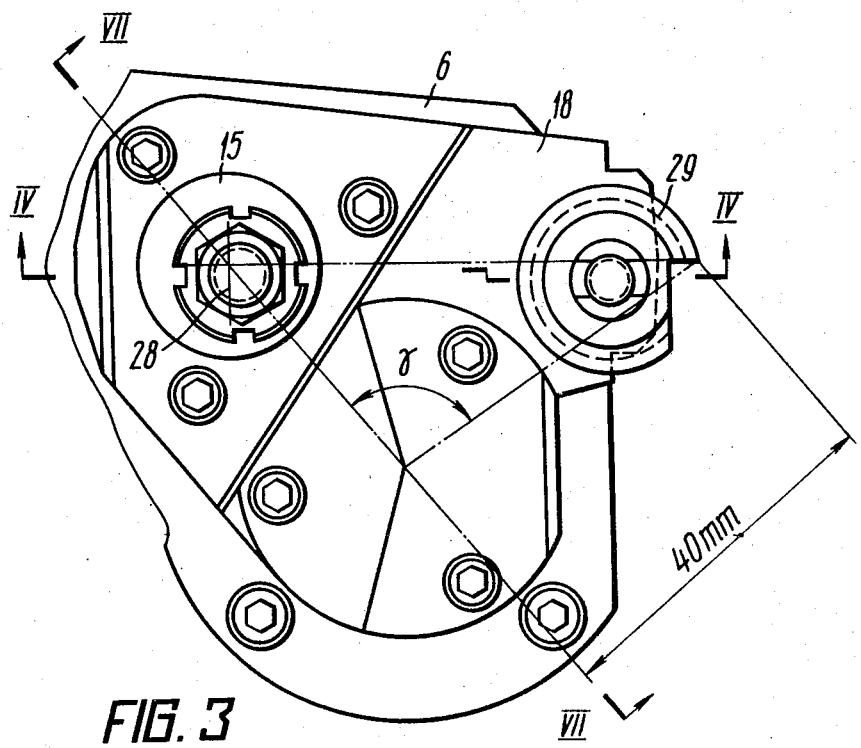
FIG. 3 is a view in the direction of arrow III in FIG. 2.

The bearings 7 and 9 accommodate a sleeve 10 (FIGS. 2 and 7) wherein there is a radially offset bore, adapted to journal a shaft 11, having an eccentric portion or crank pin 12. The bearings 8 (FIGS. 4 and 7) receive a shaft 13 having an eccentric portion or crank pin 14 therein journaled in a radially offset bore provided in a sleeve 15 (FIGS. 3 and 4). The portions 11-12 and 13-14 constitute first and second crank mechanisms of adjustable eccentricity (which may be controlled by means of the sleeves 10 and 15 respectively) and serve as respective adjusting assemblies.

The eccentricities of each of the associated pairs of parts 10, 11-12 (FIG. 2) and 15, 13-14 (FIG. 4) are equal to each other.

Onto the eccentric portion 12 are seated bearings 16 (FIGS. 2 and 7) and onto portion 14 are seated bearing 17 (FIGS. 4 and 7) the bearings 16 and 17 are installed in respective bores of element 18 on which the tool 29 is directly secured, this being preferably a notched bevelled disk. Hereinafter, the element 18 will be termed a toolholder.

The bearings 16, 17 and the shafts 11, 13 with crank pins 12, 14, 13, respectively and the toolholder 18 in combination constitute a drive connection make up a lever system or linkage, for the drive of the tool 29.

The basic readjustment involves the two adjusting assemblies and consists in a change of the angular position of shaft 11 and crank pin 14 within the bores of corresponding sleeves 10 and 15, and due to this, it is possible to obtain interdisplacement of the axis of the crank pin 12 and that of sleeve 10 and the axes of shaft 13 and sleeve 15 ranging from zero up to twice the magnitude of eccentricity. Two clutch members designated 19 (FIGS. 2 and 7) and 20 (FIGS. 4 and 7) are formed on the sleeves 10 and 15, and two corresponding mating members 21 (FIGS. 2 and 7) and 22 (FIGS. 4 and 7) are seated by keys 23 (FIG. 2) and 24 (FIG. 4) onto the shaft 11 and the crank pin 14, respectively.

The mating clutch members 19-21 and 20-22 are clamped together to lock the adjusting assemblies with selected magnitudes of eccentricity by means of two pairs of related engaging nuts 25 (FIGS. 2 and 7) and 26 (FIGS. 4 and 7) screw threads 27 and 28 are formed on the shaft 11 and the eccentric portion 14, respectively.

To set up a required eccentricity of the first crank mechanism of the first adjustable assembly, it is necessary to loosen the nut 25 and bring out of mesh the clutch member 19 and its mating member 21, which allows turning of the shaft 11 through a given angle with respect to the sleeve 10. Then, the nut 25 is tightened to bring members 19 and 21 into mesh again with the shaft 11 secured in a new angular position with respect to the sleeve 10. To set up a required eccentricity of the second crank mechanism of the second adjustable assembly it is necessary to loosen the nut 26 and bring out of mesh the clutch member 20 and its mating member 22, which allows turning of the crank pin 14 through a given angle with respect to the sleeve 15. Then, the nut 26 is tightened to bring members 20 and 22 into mesh again with the crank pin 14 secured in a new angular position with respect to sleeve 15 (FIG. 7). Thus, the tool holder 18 carries bearings 16 of the first adjustable assembly and bearings 17 of the second adjustable assembly, and the tip of the tool 29 and the axes of both bearings represent vertices of an imaginary triangle in the plane of tool holder 18 as seen in FIGS. 3 and 5.

The tip of the tool 29 (FIG. 5) is spaced from the line connecting the segment of the straight axes of bearings 16 and 17, by a distance not less than 40 mm.

The tool tip lies on a straight line passing through the axis of the bearing 16 disposed within the toolholder 18, said line being inclined at an angle $\gamma$ no greater than 120° to the segment of the straight line that connects the axes of bearings 16 and 17.

When it is required to set up a given trajectory of the tool movement to cut a tooth 30 (FIG. 5) of a gear, it is necessary to adjust the adjustment elements 10, 11, 12 and 13, 14, 15.

The distances between the axes of bearings 16 and 17 and their respective associated bearings 7, 9 and 8 relative to the support 6 are approximately equal to each other as seen in FIG. 5.

For providing movement of the tool 29 there is a drive transmission including gear 31 (FIG. 2) rigidly fitted onto the sleeve 10 which is connected with an electric motor (not shown) through gear 32, shaft 33 and gear 34.

For the sake of better understanding, FIG. 5 shows one relative position of the tool driving elements, and the arrows show the movement of the adjusting assemblies and the tool in the course of operation.

The machine operates as follows. After the machine is set up for cutting, the tool drive is actuated to impart motion to the tool through gear 34, shaft 33 and a gear pair 31–32 to the sleeve 10 and further via toothed clutch members 19, 21 to the shaft 11 which in turn, imparts movement to the toolholder 18 via crack pin 12.

Upon each revolution of the sleeve 10, the toolholder 18 performs a complex movement which involves rotary motion about the geometrical axis of the sleeve 10 and simultaneous oscillatory motion about the geometrical axis of shaft 13 provided the total eccentricities of the adjustment elements are not equal to zero).

Said complex movement is imparted to the tool 29 and the latter moves along the path indicated by arrow "A"(FIG. 6) and its tip describes a closed wedge-type curve 35.

This wedge-type closed curve 35 cannot be specified by a major or minor diameter and therefore it differs from an elliptical curve.

The wedge-type closed curve with points symbolized by letter "P" with indices that correspond to different angles of turn of the sleeve 10 clearly shows the substantially rectilinear region of the trajectory of the tool tip movement between points $P_{30°} - P_{330°}$. This region is employed as the active movement of the tool for cutting the sides of the tooth lengthwise and the bottom of the tooth space.

Additionally, it is possible to obtain a desired trajectory of the tool movement of a predetermined radius of curvature by adjusting the setting of the adjusting assemblies. Due to this it becomes possible to form the tooth of any desired shape.

The cutting edge of the tool 29 is disposed normal to the axis of the sleeve 10 and will move in the plane of the side surface of the tooth of the generating gear and owing to the generating motion of the drum 1 will develop the profile shape of the one side of the tooth slot. The other side of the tooth slot will be profiled by a second cutter (not shown).

During the return motion of the tool its cutting edge is clear of the tooth slot, owing to which, the second tool may operate in the same slot.

Moreover, it will be found that the machine of the invention will offer still more advantages.

As can be seen from FIG. 6 the rate of movement of the tool varies along the trajectory: within the cutting zone the rate of movement is substantially uniform, while the rate of return movement through the major part of the trajectory ($P_{120°} - P_{270°}$) is increased, whereby it is possible to increase the productivity of the machine. The tool clears the tooth space (between points $P_{315°} - P_{270°}$) by a relatively small distance and therefore the machine is applicable to cut gears with forwardly projecting hubs.

What is claimed is:

1. Tool drive means for a gear cutting machine for generating straight toothed bevel gears comprising a tool support means, a tool holder mounted on said tool support means, a tool drive means, and a tool drive transmission for said tool drive means, said tool drive means comprising first and second adjusting assemblies for setting a path of movement of said tool, each assembly comprising a crank mechanism having adjustable $e$ eccentricity; said first adjusting assembly comprising a sleeve having a radially offset bore rotatively mounted in said tool support means, said sleeve being coupled to said drive transmission to be driven thereby and interacting with the associated crank mechanism of the first assembly, said crank mechansm of the first assembly comprising a shaft mounted in the bore of said sleeve for being driven in rotation therewith, and a crank pin integral with the shaft and eccentric therewith, said pin being rotatably engaged in said tool holder and carrying the same, and a clamping means for fixing the mutual angular position of said sleeve and said shaft of said crank mechanism after adjusting the relative eccentricity of the sleeve and the crank pin; said crank mechanism of said second adjusting assembly comprising a second shaft rotatably mounted in said tool support means, and a second crank pin integral with the latter said shaft and eccentric therewith, the second adjusting assembly comprising a sleeve with a radially offset bore mounted on said second crank pin and capable of rotating within said tool holder, and a clamping means for fixing the mutual angular position of said second crank pin and said second sleeve after adjusting the relative eccentricity of the second sleeve with respect to the second shaft; the rotation of the shaft of the first crank mechanism causing the tool holder to swing via the sleeve of the second adjusting mechanism about the shaft of the second crank mechanism, the imaginary straight lines lying in the plane of motion of the tool holder which intersect the geometric axis of rotation of said crank pin of said first adjusting assembly and the geometric axis of swinging of said sleeve of said second adjusting assembly and pass through the tip of said tool forming a triangle; the construction of said adjusting assemblies and their relative position with respect to said tool support and said tool holder providing movement of the tool along a closed wedge-like curve.

2. A tool drive means in accordance to claim 1 in which said tool tip is located not less than 40mm from the imaginary line segment connecting the geometric axes of said crank pin of the first adjusting assembly and of said sleeve of the second adjusting assembly.

3. A tool drive means in accordance to claim 2 in which the imaginary straight line extending through the geometric axis of said crank pin of the first adjusting assembly and the tip of the tool is inclined at an angle not greater than 120° with respect to the imaginary line segment connecting the geometric axes of said crank pin of said first adjusting assembly and the sleeve of said second adjusting assembly.

* * * * *